United States Patent
Kumon

(10) Patent No.: US 11,052,823 B2
(45) Date of Patent: *Jul. 6, 2021

(54) VEHICLE REAR MONITORING SYSTEM

(71) Applicant: TOYOTA JIDOSHA KABUSHIKI KAISHA, Aichi-ken (JP)

(72) Inventor: Hitoshi Kumon, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/694,541

(22) Filed: Nov. 25, 2019

(65) Prior Publication Data

US 2020/0086794 A1    Mar. 19, 2020

Related U.S. Application Data

(63) Continuation of application No. 15/450,973, filed on Mar. 6, 2017, now Pat. No. 10,525,885, which is a
(Continued)

(30) Foreign Application Priority Data

Dec. 22, 2011 (JP) ................................ 2011-281682

(51) Int. Cl.
*B60K 35/00* (2006.01)
*B60R 1/00* (2006.01)
*H04N 7/18* (2006.01)

(52) U.S. Cl.
CPC .............. *B60R 1/00* (2013.01); *B60K 35/00* (2013.01); *H04N 7/183* (2013.01);
(Continued)

(58) Field of Classification Search
CPC ........ B60K 2370/173; B60K 2300/207; B60K 2300/07
(Continued)

(56) References Cited

U.S. PATENT DOCUMENTS

2001/0022553 A1    9/2001  Pala et al.
2005/0174229 A1*   8/2005  Feldkamp ........ G08B 13/19695
                                                340/506
(Continued)

FOREIGN PATENT DOCUMENTS

CN    101396988 A    4/2009
DE    19741896 A1    4/1999
(Continued)

OTHER PUBLICATIONS

Communication dated May 24, 2016, from the Japanese Patent Office in counterpart Application No. 2011-281682.
(Continued)

*Primary Examiner* — Amir Shahnami
(74) *Attorney, Agent, or Firm* — Sughrue Mion, PLLC

(57) ABSTRACT

A vehicle rear monitoring system includes a camera that captures an image of an area to a rear of a vehicle, and a processing unit that processes the image captured by the camera. The processing unit creates a first vehicle rear image that is displayed in a first display area that is a portion of a display area of a display device, when traveling forward, and creates a second vehicle rear image that is displayed in a second display area that is within the display area of the display device and that is an area that includes the first display area and is larger than the first display area, when traveling backward.

18 Claims, 6 Drawing Sheets

Related U.S. Application Data continuation of application No. 14/366,932, filed as application No. PCT/IB2012/002763 on Dec. 20, 2012, now abandoned.

(52) U.S. Cl.
CPC .. *B60K 2370/152* (2019.05); *B60K 2370/173* (2019.05); *B60K 2370/21* (2019.05); *B60K 2370/349* (2019.05); *B60R 2300/207* (2013.01); *B60R 2300/70* (2013.01); *B60R 2300/806* (2013.01); *B60R 2300/8046* (2013.01); *B60R 2300/8066* (2013.01)

(58) Field of Classification Search
USPC ......................................................... 348/148
See application file for complete search history.

(56) References Cited

U.S. PATENT DOCUMENTS

| | | | |
|---|---|---|---|
| 2006/0287826 A1* | 12/2006 | Shimizu | B60Q 1/0023 701/431 |
| 2008/0122597 A1 | 5/2008 | Englander | |
| 2009/0059006 A1 | 3/2009 | Hattori et al. | |
| 2009/0079585 A1 | 3/2009 | Chinomi et al. | |
| 2010/0194596 A1* | 8/2010 | Wang | B60R 1/00 340/936 |
| 2012/0154591 A1* | 6/2012 | Baur | B60R 1/00 348/148 |
| 2012/0169875 A1 | 7/2012 | Matsukawa et al. | |
| 2013/0120578 A1* | 5/2013 | Iga | B62D 15/0295 348/148 |
| 2013/0321629 A1* | 12/2013 | Zhang | B60R 1/00 348/148 |
| 2014/0347489 A1 | 11/2014 | Kumon | |
| 2017/0174133 A1 | 6/2017 | Kumon | |

FOREIGN PATENT DOCUMENTS

| | | |
|---|---|---|
| DE | 102010020201 A1 | 5/2011 |
| JP | 5539843 A | 3/1980 |
| JP | 60-70877 A | 4/1985 |
| JP | 6066175 U | 5/1985 |
| JP | 648447 U | 1/1989 |
| JP | 7205721 A | 8/1995 |
| JP | 0952555 A | 2/1997 |
| JP | 2003-081014 A | 3/2003 |
| JP | 2005-112267 A | 4/2005 |
| JP | 2007-325060 A | 12/2007 |
| JP | 2009-166624 A | 7/2009 |
| JP | 2010184588 A | 8/2010 |
| JP | 2002369186 A | 12/2012 |
| WO | 2011028686 A1 | 3/2011 |

OTHER PUBLICATIONS

Partial Translation of communication dated Mar. 6, 2015, issued by the Japanese Patent Office in counterpart Application No. 2011281682.

\* cited by examiner

VEHICLE REAR MONITORING SYSTEM

This is a Continuation of application Ser. No. 15/450,973 filed Mar. 6, 2017 (allowed), which is a continuation of application Ser. No. 14/366,932 filed Jun. 19, 2014, which is a National Stage entry of International Application No. PCT/IB2012/002763, filed Dec. 20, 2012, which claims priority to Japanese Patent Application No. 2011-281682 filed Dec. 22, 2011. The entire disclosures of the prior applications are considered part of the disclosure of the accompanying continuation application, and are hereby incorporated by reference.

BACKGROUND OF THE INVENTION

1. Field of the Invention

The invention relates to a vehicle rear monitoring system provided with a camera for capturing an image of an area to the rear of a vehicle.

2. Description of Related Art

Japanese Patent Application Publication No. 2009-166624 (JP 2009-166624 A), for example, describes a vehicle rear monitoring system that extracts, as a display image, an image of a relatively narrow area from an image of an area to the rear of a vehicle captured by a rear camera while the vehicle is traveling forward, enlarges this display image to the size comparable to an inner rearview mirror, and displays this enlarged display image on a display.

However, when the display area of the display apparatus that displays the vehicle rear image is fixed, there may be cases in which the size of the display of the vehicle rear image is not appropriate depending on the traveling situation. For example, if the display of the vehicle rear image is too large, it may be annoying to a driver when traveling forward, or if the display of the vehicle rear image is too small, the image may be difficult to visually recognize when the vehicle is traveling backward.

SUMMARY OF THE INVENTION

Thus, the invention provides a vehicle rear monitoring system capable of displaying an image in an optimal display area when a vehicle is traveling forward and in an optimal display area when the vehicle is traveling backward.

One aspect of the invention relates to a vehicle rear monitoring system that includes a camera that captures an image of an area to a rear of a vehicle and outputs the captured image; a processing unit that processes the captured image, and creates a vehicle rear image; a display device that displays the vehicle rear image; and a traveling direction detecting device that detects a traveling direction of the vehicle and notifies the processing unit of the detected traveling direction. The processing unit creates a first vehicle rear image that is the vehicle rear image that is displayed in a first display area that is a portion of a display area of the display device, when the traveling direction is forward, and creates a second vehicle rear image that is the vehicle rear image that is displayed in a second display area that is within the display area of the display device and that is an area that includes the first display area and is larger than the first display area, when the traveling direction is backward.

According to the invention, a vehicle rear monitoring system capable of displaying a vehicle rear image in an optimal display area when a vehicle is traveling forward and in an optimal display area when the vehicle is traveling backward is able to be obtained.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, example embodiments of the invention will be described with reference to the accompanying drawings.

Figure 1:
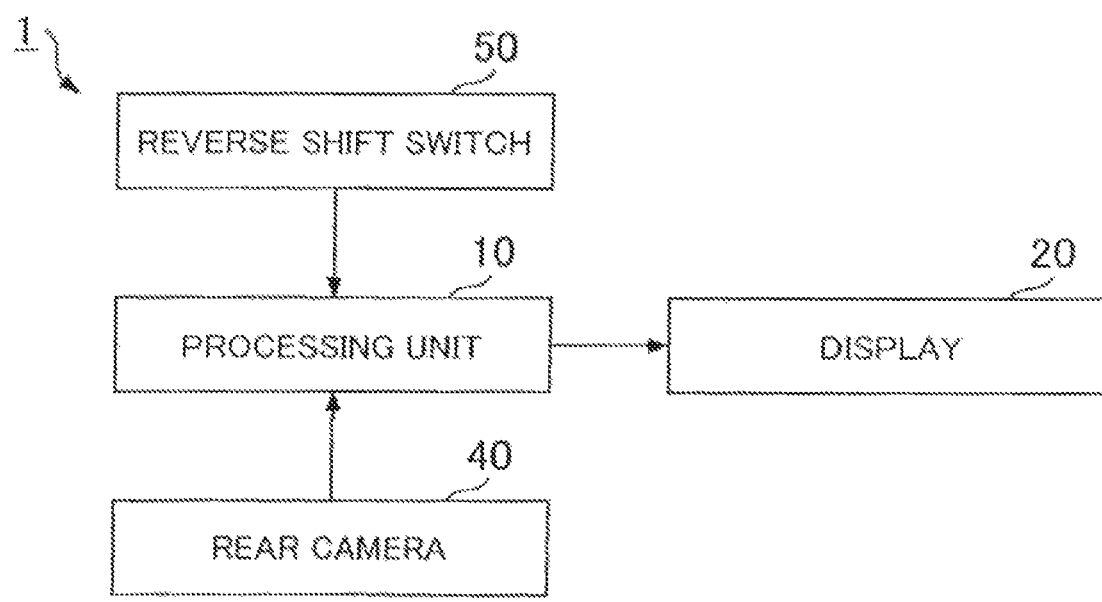
FIG. 1 is a view of an example of the basic structure of a vehicle rear monitoring system of the invention.

FIG. 1 is a view of an example of the basic structure of a vehicle rear monitoring system 1. This vehicle rear monitoring system 1 is mounted in a vehicle. The vehicle rear monitoring system 1 includes a processing unit 10.

The processing unit 10 may be formed by a computing and processing unit that includes a CPU. The functions of the processing unit 10 may be realized by hardware, software, or a combination thereof as appropriate. For example, a suitable portion or all of the functions of the processing unit 10 may be realized by an ASIC (Application-Specific Integrated Circuit), an FPGA (Field Programmable Gate Array), or a DSP (Digital Signal Processor). Also, the processing unit 10 may be realized by a plurality of processing units.

A display 20 is connected to the processing unit 10. The connection between the processing unit 10 and the display 20 may be a wire connection or a wireless connection, and may be a direct connection or an indirect connection via other equipment. Also, a portion or all of the functions of the processing unit 10 may be realized by a processing unit, not shown, inside the display 20.

The display 20 may be a suitable display device such as an LCD (Liquid Crystal Display) or HUD (Heads Up Display). The display 20 is arranged is a suitable position inside the vehicle cabin (such as the upper side of a center portion of an instrument panel). The display 20 is preferably a large display, and may be a large display that forms the entire instrument panel.

A rear camera 40 is connected to the processing unit 10. The connection between the processing unit 10 and the rear camera 40 may be a wire connection or a wireless connection, and may be a direct connection or an indirect connection via other equipment. Also, a portion or all of the functions of the processing unit 10 may be realized by a processing unit, not shown, inside the rear camera 40.

The rear camera 40 captures an image of scenery to the rear of the vehicle by an imaging element such as a CCD (Charge-Coupled Device) or a CMOS (Complementary Metal-oxide Semiconductor), and obtains a rear environment image. The rear camera 40 may be a camera capable to obtaining a visible color image, for example. The rear camera 40 may be a wide angle camera that obtains a rear environment image of a relatively wide area. Also, the rear camera 40 may be a cost-effective single focus type camera (i.e., a camera without a zoom function, in which the focal length is fixed), but it may also have a zoom function. The rear camera 40 may also be a dedicated camera, or it may be a camera that is used for other purposes (such as for parking assist control, for example). The rear camera 40 may obtain a rear environment image in real time while the vehicle is traveling, and supply this rear environment image to the processing unit 10 in a stream format of a predetermined frame period. The rear environment image may also be supplied to the processing unit 10 after undergoing predetermined processing (such as distortion correction or coordinate transformation processing, for example).

A reverse shift switch 50 is connected to the processing unit 10. This reverse shift switch 50 outputs an ON signal to the processing unit 10 when a transmission lever (i.e., a shift lever) is operated to a reverse position, and is kept off when the transmission lever is in any other position.

Figure 2:
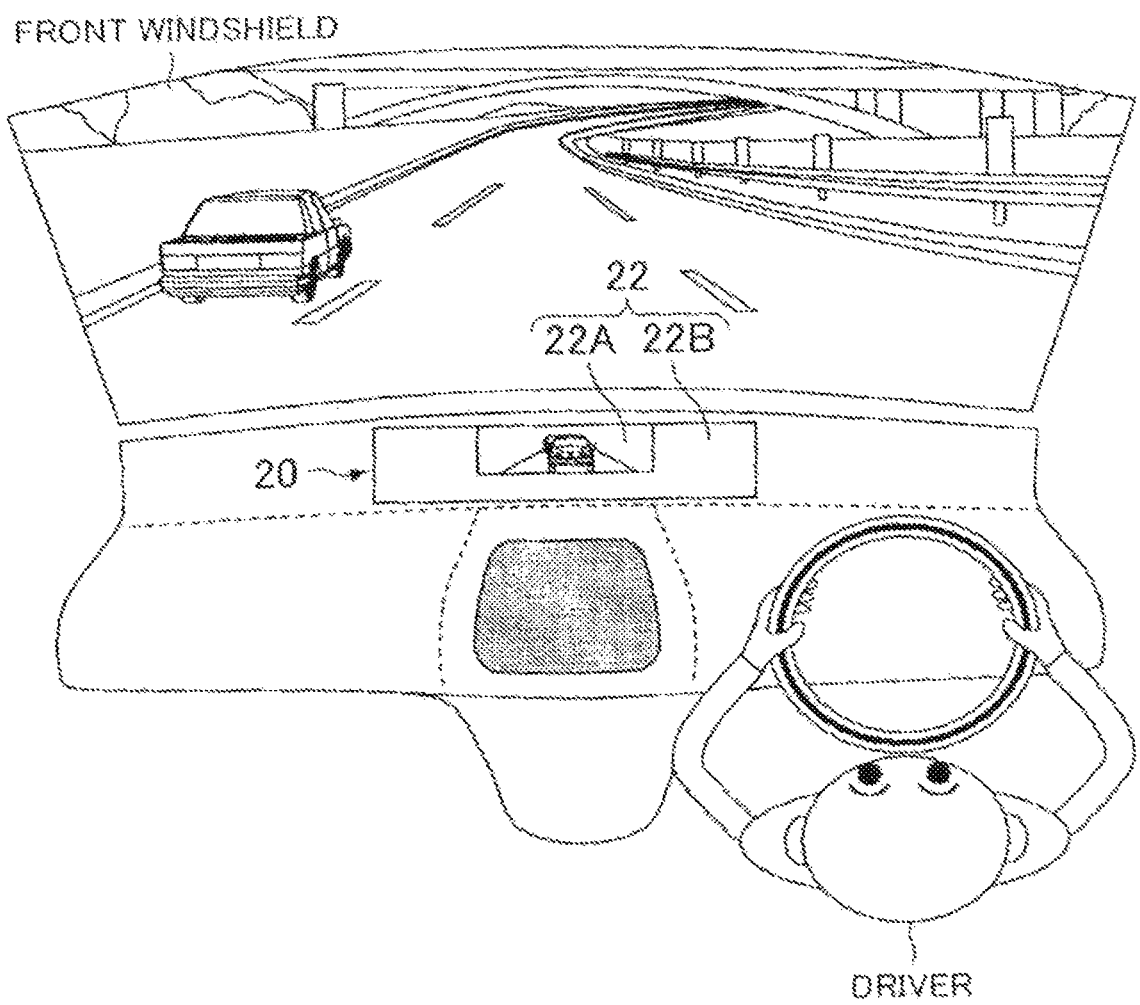
FIG. 2 is a view of an example of a mounted state of a display of the invention.

FIG. 2 is a view of an example of the mounted state of the display 20.

In FIG. 2, the display 20 is provided in a center portion of the instrument panel. The display 20 has a display area 22, as shown in FIG. 2. A first display area 22A is included in a portion of this display area 22. The first display area 22A is an area that is smaller than the display area 22. The first display area 22A may have a horizontally long outer shape that corresponds to an inner rearview mirror, for example. The first display area 22A may be set in a center portion of the display area 22. In the example shown in FIG. 2, the first display area 22A is set on ah upper side of the center portion of the display area 22. Therefore, a display area 22B excluding the first display area 22A of the display area 22 is U-shaped. Also, in the example shown in FIG. 2, the positional arrangement of the first display area 22A is substantially similar to that of the display area 22. The size of the first display area 22A of the display area 22, and position in which the first display area 22A is set and the like are arbitrary. Hereinafter, the entire display area 22 will be referred to as a "second display area 22").

Figure 3:
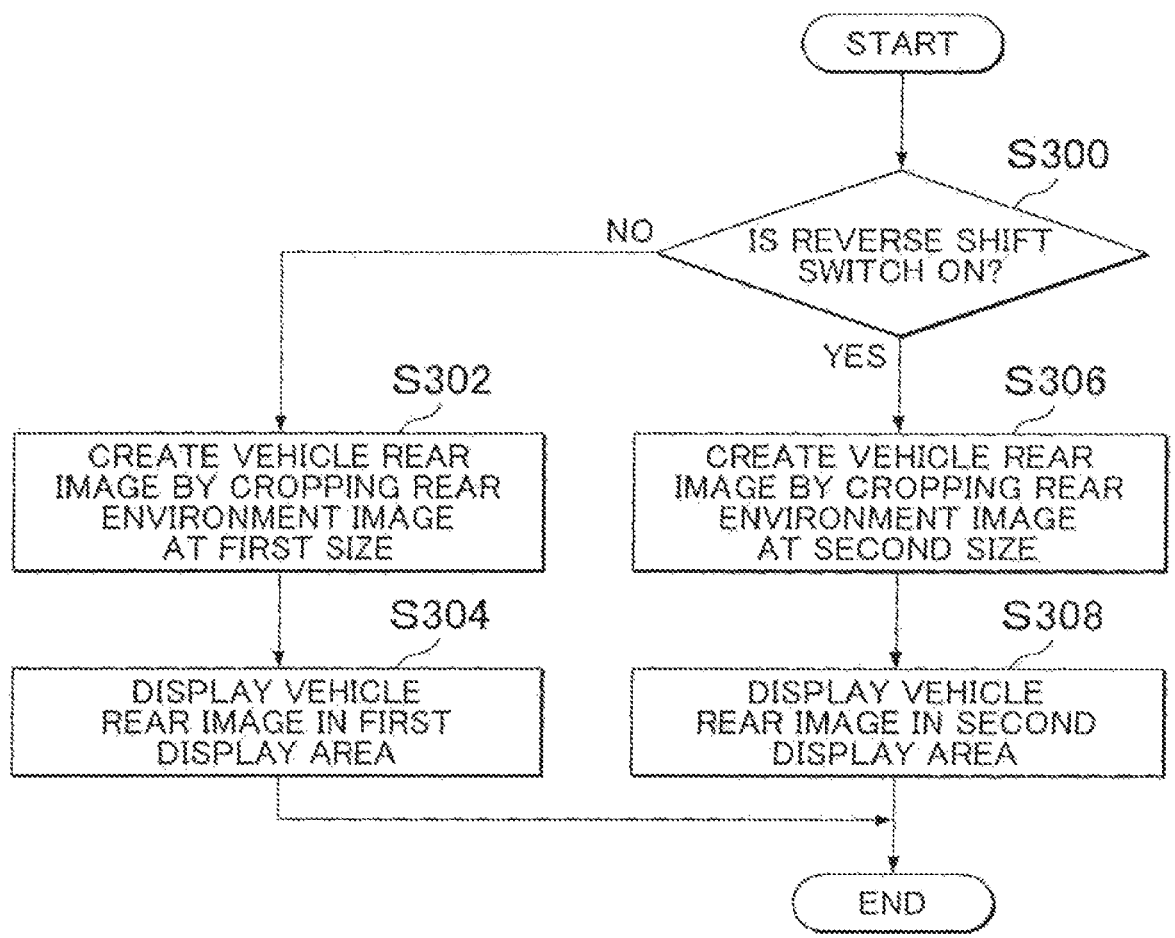
FIG. 3 is a flowchart illustrating an example of a main routine realized by a processing unit of the invention.

FIG. 3 is a flowchart illustrating an example of a main routine realized by the processing unit 10. With a configuration in which the vehicle rear image based on an image from the rear camera 40 is constantly displayed on the display 20, the routine shown in FIG. 3 may be repeatedly executed in predetermined cycles while an ignition switch of the vehicle is on, for example. With a configuration in which the vehicle rear image based on an image from the rear camera 40 is displayed on the display 20 under a predetermined condition (such as only when the driver turns on the function, for example), the routine shown in FIG. 3 may be repeatedly executed in predetermined cycles while the function is on.

In step S300, it is determined whether the reverse shift switch 50 has been turned on. That is, it is determined whether the shift lever has been shifted to the reverse position. If the reverse shift switch 50 has been turned on, the process proceeds on to step S306. If the reverse shift switch 50 has not been turned on (i.e., if the shift lever is in another shift position such as a D-range), the process proceeds on to step S302. In this way, when the traveling direction of the vehicle is forward, the process proceeds on to step S302, and when the traveling direction of the vehicle is backward, the process proceeds on to step S306. Here, the traveling direction of the vehicle is determined based solely on the position of the shift lever. Therefore, even if the vehicle speed is zero (i.e., even if the vehicle is stopped), if the shift lever is in the reverse position, it will be determined that the traveling direction is backward, and if the shift lever is in any position other than the reverse position, it will be determined that the traveling direction is forward. Also, the configuration may also be such that an image is not displayed when the shift lever is in the neutral and parking ranges.

In step S302, a vehicle rear image is created by cropping a portion of area (a first area) of the latest rear environment image input from the rear camera 40. That is, a vehicle rear image is created by trimming the latest rear environment image input from the rear camera 40 so that only the first area of that image remains. The first area may be a size corresponding to the first display area 22A.

In step S304, the vehicle rear image created in step S302 above is output to the first display area 22A of the display 20. At this time, the vehicle rear image may be enlarged or reduced by a predetermined scale factor to match the first display area 22A of the display 20. Different information (such as a map screen of a navigation system, for example) may also be displayed in the display area 22B other than the first display area 22A of the display 20. Also, the display area 22B other than the first display area 22A of the display 20 may be in a display state in which a degree of driver distraction is relatively low, such as a solid dark color such as black (i.e., a low brightness state or off). As a result, the light emitting area of the display 20 can be reduced, and the driver can be prevented from being blinded by, for example, the movement of light (a high-intensity image) in the display area 22B, particularly at night or the like.

In step S306, a vehicle rear image is created by cropping a portion of area (a second area) of the latest rear environment image input from the rear camera 40. That is, a vehicle rear image is created by trimming the latest rear environment image input from the rear camera 40 so that only the second area of that image remains. The second area may be a size corresponding to the second display area 22. The size of the second area is larger than the size of the first area used in step S302. Therefore, with respect to the original image (i.e., the rear environment image), the cropped area of the vehicle rear image created in step S306 is larger than the cropped area of the vehicle rear image created in step S302, and the size of the vehicle rear image created in step S306 is that much bigger.

In step S308, the vehicle rear image created in step S306 is output to the second display area 22 of the display 20. At this time, the vehicle rear image may be enlarged or reduced by a predetermined scale factor to match the second display area 22 of the display 20. However, in this case, the predetermined scale factor may be the same as the predetermined scale factor used in step S304. As a result, the perspective of the vehicle rear image output to the second display area 22 and the vehicle rear image output to the first display area 22A can be kept the same.

In this way, according to the routine illustrated in FIG. 3, when the traveling direction is forward, the vehicle rear image is displayed in the first display area 22A of the display 20. The first display area 22A of the display 20 is smaller than the total display area (the second display area 22 in this example) of the display 20 as described above. Therefore, the degree of driver distraction caused by a relatively large-sized vehicle rear image being displayed in the forward field of view when the traveling direction is forward is able to be appropriately reduced. Also, when displaying the vehicle rear image of the same visual range as the inner rearview mirror in the first display area 22A, the driver is able to use the display of the first display area 22A in the same way as the inner rearview mirror. Therefore, in this case, the driver is able to ultimately check the situation to the rear even if the inner rearview mirror is omitted. However, the inner rearview mirror may also be retained and used in combination with the display of the first display area 22A. On the other hand, according to the routine illustrated in FIG. 3, when the traveling direction is backward, the vehicle rear image is displayed in the second display area 22 of the display 20. The second display area 22 of the display 20 is significantly larger than the first display area 22A (in this example, the second display area 22 of the display 20 is the same as the entire display area of the display 20). Accordingly, when the traveling direction is backward, a large-sized vehicle rear image will be displayed, so visibility is good and useful information can be provided to the driver.

Figure 4A:
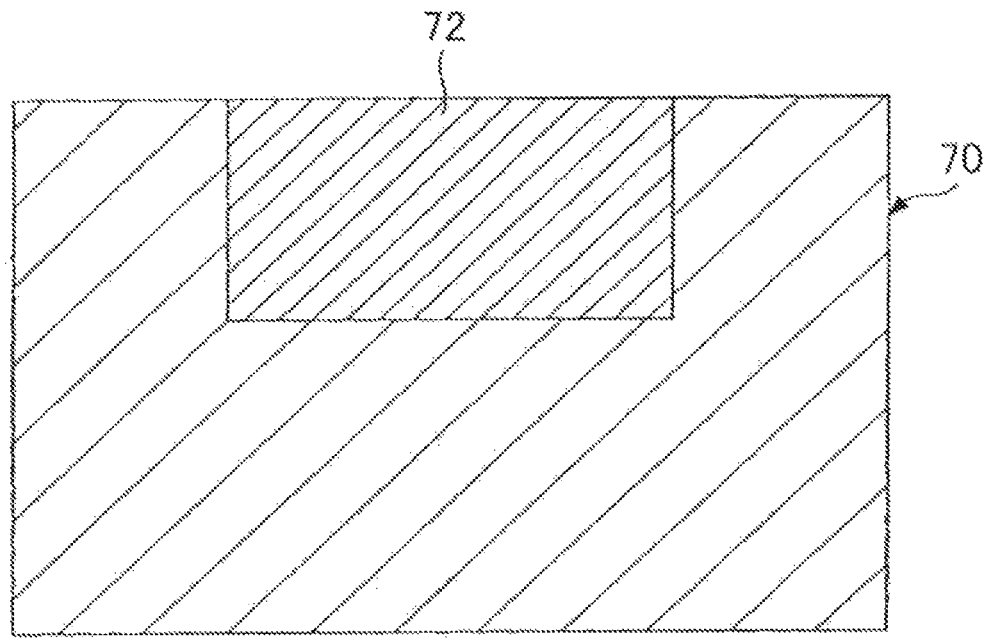
FIG. 4A is a view showing a frame format of a cropped area of a rear environment image, when a traveling direction of a vehicle is forward.
Figure 4B:
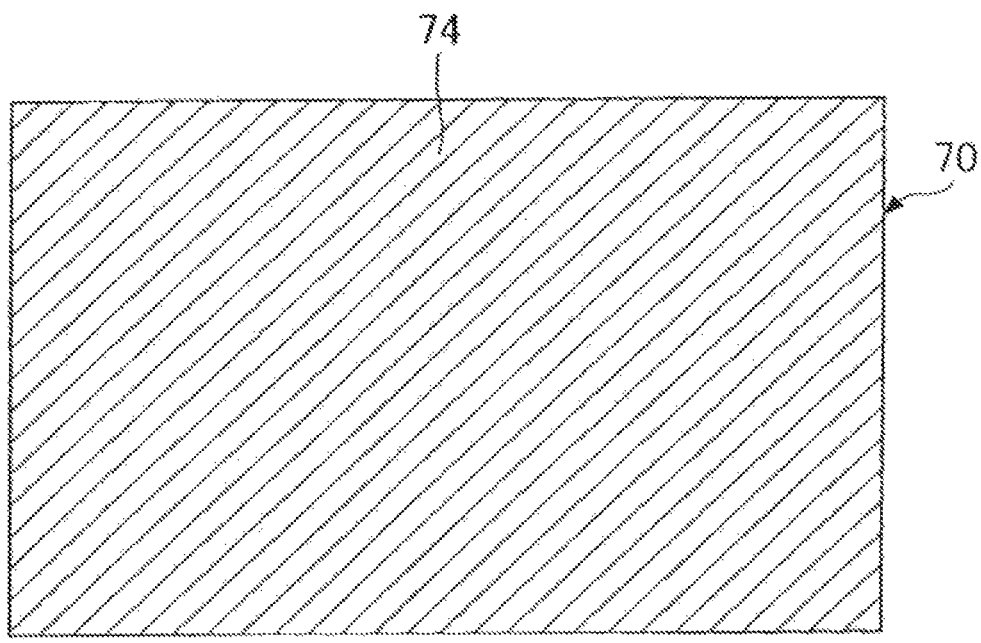
FIG. 4I is a view showing a frame format of a cropped area of the rear environment image, when the traveling direction of the vehicle is backward.

FIGS. 4A and 4B are views showing the processes in steps S302 and S306 in FIG. 3, and are views showing frame formats of a cropped area of a rear environment image (i.e., an extracted area of the vehicle rear image).

In FIG. 4A, an example of an area of the vehicle rear image extracted from a rear environment image 70 when traveling forward (i.e., in step S302) is denoted by reference character 72. In the example shown in FIG. 4A, the cropped area is set above a center portion of the rear environment image 70 and corresponds to the area of the first display area 22A shown in FIG. 2. In this way, the vehicle rear image when traveling forward may be created by trimming an area other than an area 72 of the rear environment image 70.

In FIG. 4B, an example of an area of the vehicle rear image extracted from the rear environment image 70 when traveling backward (i.e., in step S306) is denoted by reference character 74. In the example shown in FIG. 4B, the cropped area is set to the entire rear environment image 70 and corresponds to the area of the second display area 22 shown in FIG. 2. Therefore, in this example, trimming is not performed. In this way, the vehicle rear image when traveling backward may be created using the rear environment image essentially as it is.

Figure 5A:
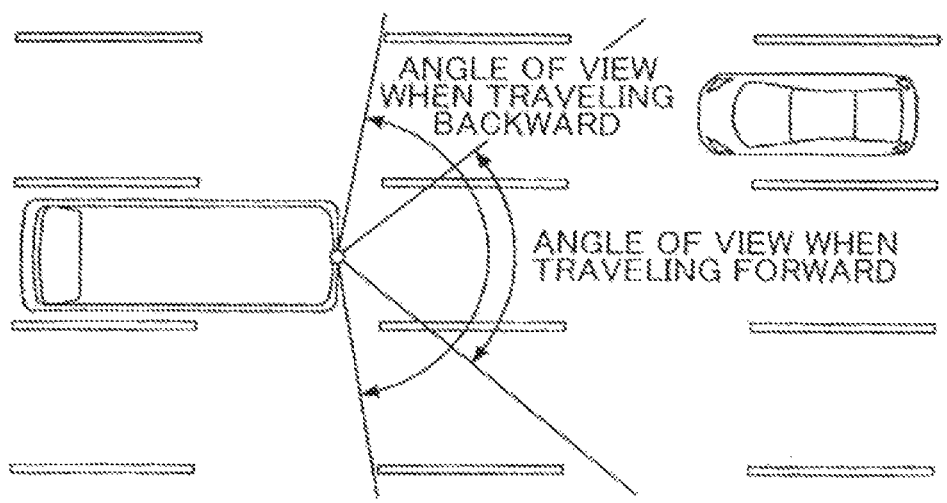
FIG. 5A is a view showing a frame format of a cropped area of a rear environment image as viewed from above the vehicle.
Figure 5B:
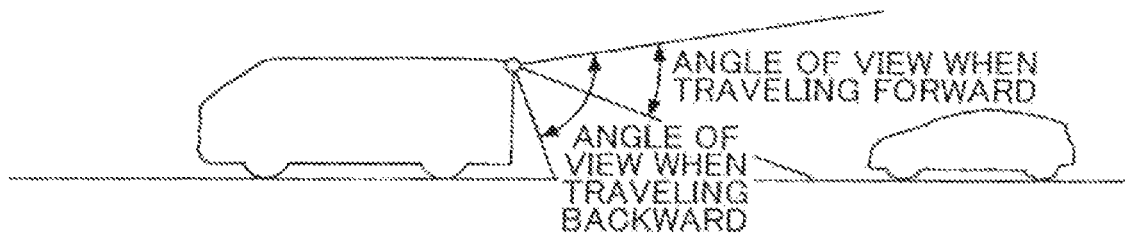
FIG. 5B is a view showing a frame format of a cropped area of a rear environment image as viewed from the side of the vehicle.

FIGS. 5A and 5B are views showing the processes in steps S302 and S306 in FIG. 3, and are views showing frame formats of a cropped area of a rear environment image (i.e., an extracted area of the vehicle rear image) from the viewpoint of the angle of view of the camera. FIG. 5A is view from above the vehicle, and FIG. 5B is a view from the side of the vehicle.

As shown in FIGS. 5A and 5B, the angle of view when the traveling direction is forward (i.e., in step S302) is set narrower than the angle of view when the 26 traveling direction is backward (i.e., step S306). More specifically, when viewed from above, as shown in FIG. 5A, the angle of view when traveling forward is set to be within a first predetermined angle left and right about a vehicle longitudinal central axis, while the angle of view when traveling backward is set to be within a second predetermined angle (>the first predetermined angle) left and right about the vehicle longitudinal central axis. The first predetermined angle may be set such that the vehicle rear image of a visual range corresponding to the visual range of the inner rearview mirror is able to be obtained, for example. The second predetermined angle may be set such that a vehicle rear image of a visual range that exceeds the visual range of the inner rearview mirror is able to be obtained, for example. For example, the second predetermined angle may be a value within a range of 80° to 90°, inclusive. Also, when viewed from the side, as shown in FIG. 5B, the angle of view when traveling forward is set to be within a third predetermined angle downward from an uppermost direction that is slightly upward from a horizontal plane, while the angle of view when traveling backward is set to be within a fourth predetermined angle (>the third predetermined angle) downward from the uppermost direction. The third predetermined angle may be set such that a vehicle rear image of a visual range corresponding to the visual range of the inner rearview mirror is able to be obtained, for example. The fourth predetermined angle may be set such that a road situation in the vicinity of 0 meters behind the vehicle (i.e., the situation immediately to the rear of the vehicle) is able to be captured. For example, the fourth predetermined angle may be set to a value within a range of 80° to 90°, inclusive.

FIGS. 5A and 5B show the areas of the vehicle rear image when the traveling direction of the vehicle is forward and when the traveling direction of the vehicle is backward, from the viewpoint of the angle of view of the camera. However, in actuality, the angle of view of the rear camera 40 is not changed. That is, an angle of view of the rear camera 40 such as that shown in FIGS. 5A and 5B is realized by varying the cropped area from the rear environment image (i.e., the extracted area of the vehicle rear image) as described above with reference to FIG. 4 and the like.

As is evident from FIGS. 5A and 5B, according to this example embodiment, when traveling forward, information within a relatively narrow angle of view is displayed on the display 20, so the degree of driver distraction from a large amount of information that includes unnecessary information when traveling forward is able to be appropriately reduced. On the other hand, when traveling backward, a vehicle rear image of a wide angle of view is displayed on the display 20, so useful information is able to be provided to the driver who should be paying attention to a wide area to the rear of the vehicle. For example, an obstacle or an object requiring attention (i.e., an object that the driver needs to be careful of) that is unable to be captured in the angle of view when traveling forward is able to be within the angle of view when traveling backward, so blind spots are able to be minimized.

Figure 6A:
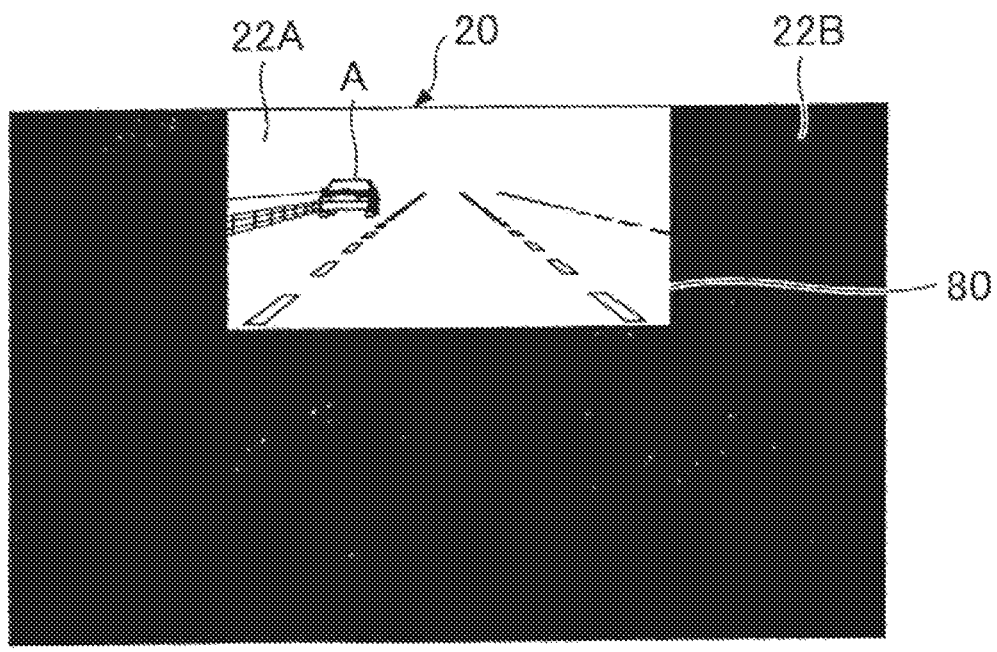
FIG. 6A is a view of an example of a vehicle rear image displayed on the display when the traveling direction of the vehicle is forward.
Figure 6B:
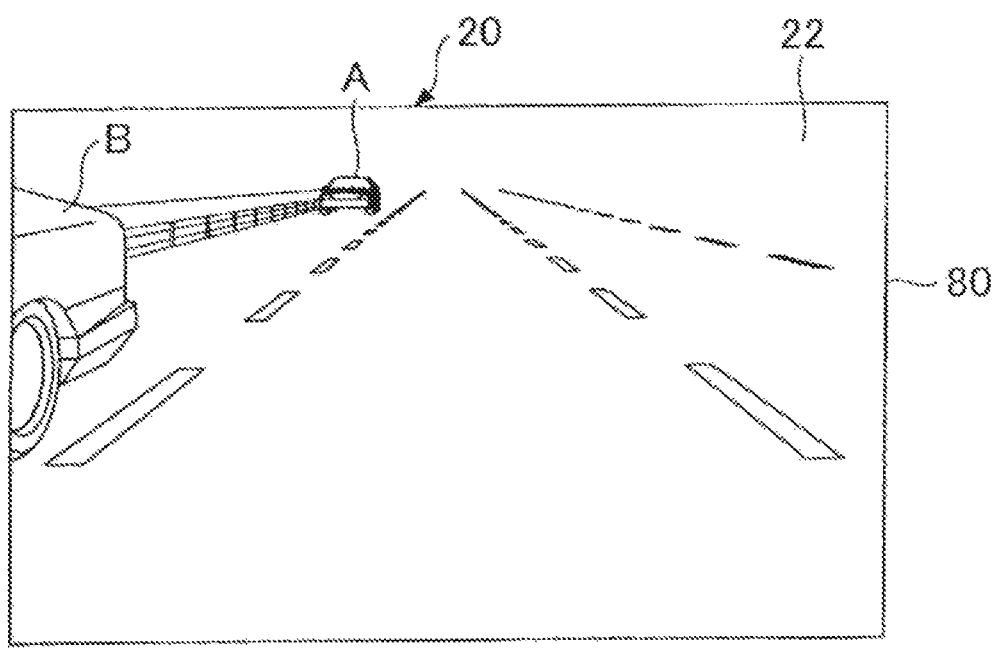
FIG. 6B is a view of an example of a vehicle rear image displayed on the display when the traveling direction of the vehicle is backward.

FIG. 6A is a view of an example of a vehicle rear image displayed on the display 20 when the traveling direction of the vehicle is forward. FIG. 6B is a view of an example of a vehicle rear image displayed on the display 20 when the traveling direction of the vehicle is backward.

When the traveling direction of the vehicle is forward, the vehicle rear image is displayed in the first display area 22A of the display 20, as shown in FIG. 6A. In the example shown in FIG. 6A, an image of another vehicle A parked on the side of the road behind the vehicle is included in the vehicle rear image. If the driver shifts the shift lever into the reverse position from this state, the vehicle rear image will be displayed with the display area of the display 20 enlarged from the first display area 22A to the second display area 22.

At this time, as shown in FIGS. 6A and 6B, an outer frame (outer shape) 80 of the vehicle rear image is enlarged to match the enlargement of the cropped area, while the focal length of the rear camera 40 is kept the same. In this way, a switch is able to be realized while keeping the focal length of the rear camera 40 the same. Therefore, the vehicle rear image that is displayed in the first display area 22A right before the switch is included in the vehicle rear image displayed in the second display area 22 at essentially the same size and positional relationship. For example, the image of the other vehicle A (the parked vehicle) included in the vehicle rear image displayed in the first display area 22A right before the switch is present in the vehicle rear image displayed in the second display area 22 at the same size and positional relationship. As a result, the driver is able to instinctively understand the relationship between the vehicle rear image displayed in the first display area 22A and the vehicle rear image displayed in the second display area 22 currently switched to, and is therefore able to quickly obtain the necessary information from the vehicle rear image displayed in the second display area 22. That is, when the two switch, objects in the visible range do not change, so the same perspective is able to be maintained. As a result, the driver is able to easily and appropriately determine the area where objects to the rear within the new field of vision (such as another vehicle B in FIG. 6B) are.

Also, when this switch is made, the outer frame 80 of the vehicle rear image may be continuously changed by animation display. That is, the outer frame 80 is enlarged in a stepped manner from the size shown in FIG. 6A to the size shown in FIG. 6B. In conjunction with this, the cropped area for the vehicle rear image may also be continuously enlarged. As a result, the driver is able to instinctively understand the relationship between the vehicle rear image displayed in the first display area 22A and the vehicle rear image displayed in the second display area 22 currently switched to, and is therefore able to quickly obtain the necessary information from the vehicle rear image displayed in the second display area 22. However, the switch from the vehicle rear image shown in FIG. 6A to the vehicle rear image shown in FIG. 6B may also be made in a discontinuous manner (i.e., instantly), without using the animation display.

Also, conversely, if the driver shifts the shift lever from the reverse position to another position, the vehicle rear image will be displayed with the display area of the display 20 reduced from the second display area 22 (i.e., from the state shown in FIG. 6B) to the first display area 22A, as shown in FIG. 6A. At this time, similarly, the outer frame (i.e., the outer shape) 80 of the vehicle rear image is reduced to match the reduction of the cropped area, while the focal length of the rear camera 40 is kept the same, as shown in FIGS. 6A and 6B. Also, when this switch is made, the outer frame 80 of the vehicle rear image may be continuously changed by animation display. That is, the outer frame 80 may be reduced in a stepped manner from the size shown in FIG. 68 to the size shown in FIG. 6A. However, the switch from the vehicle rear image shown in FIG. 6A to the vehicle rear image shown in FIG. 6B may also be made in a discontinuous manner (i.e., instantly), without using the animation display.

In this example embodiment, when the outer frame 80 of the vehicle rear image is enlarged or reduced, only the cropped area is enlarged or reduced as described above, i.e., the vehicle rear image is not enlarged or reduced to match the enlargement or reduction of the outer frame 80. However, the focal length does not necessarily have to be kept the same as long as the driver is able to understand the relationship between the vehicle rear image displayed in the first display area 22A and the vehicle rear image displayed in the second display area 22 by following the animation display that enlarges or reduces the outer frame 80 as described above, for example. When a switch is made from the vehicle rear image shown in FIG. 6A to the vehicle rear image shown in FIG. 6B, for example, animation display that enlarges the outer frame 80 may be performed, and the focal length may be continuously (gradually) reduced (the zoom factor may be gradually increased). However, in this case as well, the difference in the cropped area from the rear environment image when traveling forward compared with when traveling backward may be able to be maintained (i.e., the cropped area when traveling backward may be set larger than the cropped area when traveling forward). With this modified example, there is a possibility that the processing load and cost may change by the amount of the required processing to vary the focal length (or this function). Also, the focal length changes before and after the switch, so the perspective of the display will change before and after the switch.

While various example embodiments of the invention have been described, the invention is not intended to be limited to these example embodiments. That is, various modifications and substitutions may be made to the example embodiments described above without departing from the scope of the invention.

For example, in the example embodiment described above, the second display area 22 corresponds to the entire display area of the display 20, but it may also be only a portion of the entire display area of the display 20 as long as it is larger than the first display area 22A. Also, in the example embodiment described above, the vehicle rear image displayed in the second display area 22 is directly created from the rear environment image (i.e., created without trimming), but it may also be created by cropping a portion of the rear environment image as long as it includes, and is wider than, the cropped area for creating the vehicle rear image displayed in the first display area 22A.

Also in the example embodiment described above, the cropped area for creating the vehicle rear image displayed in the first display area 22A is fixed, but it may also be variable. Similarly, the cropped area for creating the vehicle rear image displayed in the second display area 22 is fixed, but it may also be variable.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A vehicle rear monitoring system, comprising:
a camera configured to capture an image of an area to a rear of a vehicle;
a processor configured to process the captured image and to create a vehicle rear image; and
a display that displays the vehicle rear image, wherein the processor is further configured to:
create a vehicle rear image of a first angle of view by using an image captured by the camera when a traveling direction of the vehicle is forward;

create a vehicle rear image of a second angle of view by using an image captured by the camera when the traveling direction of the vehicle is rearward, wherein the first angle of view is narrower than the second angle of view, wherein the second angle of view expands more downward than the first angle of view; and display the vehicle rear image of the first angle of view or the vehicle rear image of the second angle of view according to the traveling direction of the vehicle.

2. The vehicle rear monitoring system according to claim 1, wherein the processor is configured to create the vehicle rear image of the first angle of view by cropping a first area of the image captured by the camera when the traveling direction of the vehicle is forward.

3. The vehicle rear monitoring system according to claim 2, wherein the processor is configured to create the vehicle rear image of the second angle of view by cropping a second area of the image captured by the camera when the traveling direction of the vehicle is rearward, and the second area is larger than the first area.

4. The vehicle rear monitoring system according to claim 1, wherein the processor is configured to control the camera to capture the image of the first angle of view when the traveling direction of the vehicle is forward, and to control the camera to capture the image of the second angle of view when the traveling direction of the vehicle is rearward.

5. The vehicle rear monitoring system according to claim 1, wherein the processor is configured to continuously change an outer frame of a display area of the vehicle rear image by animation display when the traveling direction is changed.

6. The vehicle rear monitoring system according to claim 1, wherein the processor is configured to place a remaining area of the display, other than an area displaying the vehicle rear image of the first angle of view, in a display state of a solid dark color when the display is displaying the vehicle rear image of the first angle of view.

7. The vehicle rear monitoring system according to claim 1, wherein the vehicle rear image of the second angle of view is captured at the same focal length as the vehicle rear image of the first angle of view.

8. A vehicle comprising:

a camera configured to capture an image of an area to a rear of the vehicle;

a processor configured to process the captured image and to create a vehicle rear image; and a display that displays the vehicle rear image, wherein the processor is further configured to:

create a vehicle rear image of a first angle of view by using an image captured by the camera when a traveling direction of the vehicle is forward;

create a vehicle rear image of a second angle of view by using an image captured by the camera when the traveling direction of the vehicle is rearward, wherein the first angle of view is narrower than the second angle of view, wherein the second angle of view expands more downward than the first angle of view; and display the vehicle rear image of the first angle of view or the vehicle rear image of the second angle of view according to the traveling direction of the vehicle.

9. The vehicle according to claim 8, wherein the processor is configured to create the vehicle rear image of the first angle of view by cropping a first area of the image captured by the camera when the traveling direction of the vehicle is forward.

10. The vehicle according to claim 9, wherein the processor is configured to create the vehicle rear image of the second angle of view by cropping a second area of the image captured by the camera when the traveling direction of the vehicle is rearward, and the second area is larger than the first area.

11. The vehicle according to claim 8, wherein the processor is configured to control the camera to capture the image of the first angle of view when the traveling direction of the vehicle is forward, and to control the camera to capture the image of the second angle of view when the traveling direction of the vehicle is rearward.

12. The vehicle according to claim 8, wherein the processor is configured to continuously change an outer frame of a display area of the vehicle rear image by animation display when the traveling direction is changed.

13. The vehicle according to claim 8, wherein the processor is configured to place a remaining area of the display, other than an area displaying the vehicle rear image of the first angle of view, in a display state of a solid dark color when the display is displaying the vehicle rear image of the first angle of view.

14. The vehicle according to claim 8, wherein the vehicle rear image of the second angle of view is captured at the same focal length as the vehicle rear image of the first angle of view.

15. A non-transitory storage medium storing instructions that is executable by a processor that is mounted on a vehicle mounting a camera and a display, wherein the instructions configured to cause the processor to perform functions including:

creating a vehicle rear image of a first angle of view by using an image captured by the camera when a traveling direction of the vehicle is forward;

creating a vehicle rear image of a second angle of view by using an image captured by the camera when the traveling direction of the vehicle is rearward, wherein the first angle of view is narrower than the second angle of view, wherein the second angle of view expands more downward than the first angle of view; and displaying the vehicle rear image of the first angle of view or the vehicle rear image of the second angle of view on the display according to the traveling direction of the vehicle.

16. The non-transitory storage medium according to claim 15, wherein the functions further includes creating the vehicle rear image of the first angle of view by cropping a first area of the image captured by the camera when the traveling direction of the vehicle is forward.

17. The non-transitory storage medium according to claim 16, wherein the functions further includes creating the vehicle rear image of the second angle of view by cropping a second area of the image captured by the camera when the traveling direction of the vehicle is rearward, and the second area is larger than the first area.

18. The non-transitory storage medium according to claim 15, wherein
the functions further includes controlling the camera to capture the image of the first angle of view when the traveling direction of the vehicle is forward, and to control the camera to capture the image of the second angle of view when the traveling direction of the vehicle is rearward.

\* \* \* \* \*